(12) United States Patent
Derzhavetz et al.

(10) Patent No.: US 11,615,028 B2
(45) Date of Patent: Mar. 28, 2023

(54) SYSTEM AND METHOD FOR LOCKLESS DESTAGING OF METADATA PAGES

(71) Applicant: EMC IP Holding Company, LLC, Hopkinton, MA (US)

(72) Inventors: Jenny Derzhavetz, Raanana (IL); Vladimir Shveidel, Pardes-Hana (IL); Dror Zalstein, Givatayim (IL); Bar David, Rishon Lezion (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 100 days.

(21) Appl. No.: 17/237,359

(22) Filed: Apr. 22, 2021

(65) Prior Publication Data
US 2022/0342825 A1 Oct. 27, 2022

(51) Int. Cl.
*G06F 12/0882* (2016.01)
*G06F 9/30* (2018.01)
*G06F 12/123* (2016.01)
*G06F 12/02* (2006.01)

(52) U.S. Cl.
CPC ...... *G06F 12/0882* (2013.01); *G06F 9/30047* (2013.01); *G06F 12/0238* (2013.01); *G06F 12/123* (2013.01)

(58) Field of Classification Search
CPC .......... G06F 9/30047; G06F 12/0238; G06F 12/0882; G06F 12/123
See application file for complete search history.

(56) References Cited

U.S. PATENT DOCUMENTS

| | | | |
|---|---|---|---|
| 2003/0051113 A1* | 3/2003 | Beardsley | G06F 12/0866 711/E12.019 |
| 2016/0011801 A1* | 1/2016 | Goldberg | G06F 12/0246 711/114 |
| 2016/0232102 A1* | 8/2016 | Ash | G06F 12/0804 |
| 2017/0024140 A1* | 1/2017 | Shivanand | G06F 3/065 |
| 2019/0050157 A1* | 2/2019 | Anderson | G06F 3/0637 |
| 2020/0293447 A1* | 9/2020 | Gupta | G06F 12/0868 |

\* cited by examiner

*Primary Examiner* — Aracelis Ruiz
(74) *Attorney, Agent, or Firm* — Brian J. Colandreo; Mark H. Whittenberger; Holland & Knight LLP

(57) ABSTRACT

A method, computer program product, and computing system for receiving a flush request for a metadata page stored in a storage array of a multi-node storage system. The flush request may be queued on a flush request lock queue on at least one node of the multi-node storage system. One or more flush requests may be processed, via multiple nodes of the multi-node storage system, on the metadata page based upon, at least in part, the flush request lock queue.

14 Claims, 11 Drawing Sheets

SYSTEM AND METHOD FOR LOCKLESS DESTAGING OF METADATA PAGES

BACKGROUND

Storing and safeguarding electronic content may be beneficial in modern business and elsewhere. Accordingly, various methodologies may be employed to protect and distribute such electronic content.

For example, conventional approaches for synchronizing read hit operations, commit operations, and destage operations include applying locks on the cache memory system while performing the respective operation. With a read hit operation, conventional approaches: obtain a lock on the cache memory system; read the metadata page specified by a read request from the cache memory system; and release the lock on the cache memory system. With a commit operation, conventional approaches: obtain a lock on the cache memory system; flush the metadata page from the cache memory system to a storage array; and release the lock on the cache memory system. With a destage operation, conventional approaches: obtain a lock on the cache memory system; read the metadata page to destage from the storage array; apply one or more metadata updates to the metadata page; flush the metadata page to the storage array; and release the lock on the cache memory system. In this manner, conventional approaches require cache memory system locks for each of these operations.

Further, destage operations may need to be synchronized with commit operations across multiple nodes of a multi-node storage system. For example, it is possible for the same metadata page to be updated by applying new metadata updates (e.g., with a destage operation) and/or by flushing an up-to-date version of the metadata page (e.g., with a commit operation). Without synchronization, the following problems may be observed: 1) different destage or commit operations from multiple nodes may update the metadata page in the storage array simultaneously, creating non-consistent metadata page; and 2) a newer version of a metadata page flushed by a commit operation may be overwritten by an older, stale version of a metadata page when flushed by a destage operation.

However, obtaining a lock on the cache memory system for flush operations may also block read operations from the cache memory system. Accordingly, using a cache memory system lock to synchronize destage and commit operations according to conventional approaches may introduce contention with read operations and may increase IO latency and decreases system performance overall.

SUMMARY OF DISCLOSURE

In one example implementation, a computer-implemented method executed on a computing device may include, but is not limited to, receiving a flush request for a metadata page stored in a storage array of a multi-node storage system. The flush request may be queued on a flush request lock queue on at least one node of the multi-node storage system. One or more flush requests may be processed, via multiple nodes of the multi-node storage system, on the metadata page based upon, at least in part, the flush request lock queue.

One or more of the following example features may be included. The flush request may be a request to commit the metadata page from a cache memory system to the storage array, thus defining a commit request. Processing, via the multiple nodes of the multi-node storage system, the one or more flush requests on the metadata page based upon, at least in part, the flush request lock queue may include determining, at each node of the multi-node storage system, whether a destage request for the metadata page is being processed on the node based upon, at least in part, the flush request lock queue; in response to determining that the destage request for the metadata page is being processed on at least one node, waiting until the destage request is cleared from the flush request lock queue; and in response to determining that the destage request for the metadata page is not being processed on any node, processing, via one node of the multi-node storage system, the commit request. The flush request may be a request to destage the metadata page to the storage array, thus defining a destage request. Processing, via the multiple nodes of the multi-node storage system, the one or more flush requests on the metadata page based upon, at least in part, the flush request lock queue may include reading the metadata page from the storage array; determining a current tablet identifier for the metadata page; and processing the destage request based upon, at least in part, the current tablet identifier for the metadata page. Processing the destage request based upon, at least in part, the current tablet identifier for the metadata page may include: skipping the destage request when the current tablet identifier for the metadata page indicates that the metadata page read from the storage array is newer than the metadata data page to destage; and processing the destage request when the current tablet identifier for the metadata page indicates that the metadata page read from the storage array is older than the metadata data page to destage. A failure of at least one node of the multi-node storage system may be determined. Flush requests for each metadata page referenced within the flush request lock queue may be paused. Each metadata page referenced within the flush request lock queue may be flushed from a non-volatile storage area to the storage array.

In another example implementation, a computer program product resides on a computer readable medium that has a plurality of instructions stored on it. When executed by a processor, the instructions cause the processor to perform operations that may include, but are not limited to, receiving a flush request for a metadata page stored in a storage array of a multi-node storage system. The flush request may be queued on a flush request lock queue on at least one node of the multi-node storage system. One or more flush requests may be processed, via multiple nodes of the multi-node storage system, on the metadata page based upon, at least in part, the flush request lock queue.

One or more of the following example features may be included. The flush request may be a request to commit the metadata page from a cache memory system to the storage array, thus defining a commit request. Processing, via the multiple nodes of the multi-node storage system, the one or more flush requests on the metadata page based upon, at least in part, the flush request lock queue may include determining, at each node of the multi-node storage system, whether a destage request for the metadata page is being processed on the node based upon, at least in part, the flush request lock queue; in response to determining that the destage request for the metadata page is being processed on at least one node, waiting until the destage request is cleared from the flush request lock queue; and in response to determining that the destage request for the metadata page is not being processed on any node, processing, via one node of the multi-node storage system, the commit request. The flush request may be a request to destage the metadata page to the storage array, thus defining a destage request. Processing, via the multiple nodes of the multi-node storage system, the one or more flush requests on the metadata page based upon, at least in part, the flush request lock queue may include reading the metadata page from the storage array; determining a current tablet identifier for the metadata page; and processing the destage request based upon, at least in part, the current tablet identifier for the metadata page. Processing the destage request based upon, at least in part, the current tablet identifier for the metadata page may include: skipping the destage request when the current tablet identifier for the metadata page indicates that the metadata page read from the storage array is newer than the metadata data page to destage; and processing the destage request when the current tablet identifier for the metadata page indicates that the metadata page read from the storage array is older than the metadata data page to destage. A failure of at least one node of the multi-node storage system may be determined. Flush requests for each metadata page referenced within the flush request lock queue may be paused. Each metadata page referenced within the flush request lock queue may be flushed from a non-volatile storage area to the storage array.

In another example implementation, a computing system includes at least one processor and at least one memory architecture coupled with the at least one processor, wherein the at least one processor is configured to receive a flush request for a metadata page stored in a storage array of a multi-node storage system, wherein the at least one processor is further configured to queue the flush request on a flush request lock queue on at least one node of the multi-node storage system, and wherein the at least one processor is further configured to process, via multiple nodes of the multi-node storage system, one or more flush requests on the metadata page based upon, at least in part, the flush request lock queue.

One or more of the following example features may be included. The flush request may be a request to commit the metadata page from a cache memory system to the storage array, thus defining a commit request. Processing, via the multiple nodes of the multi-node storage system, the one or more flush requests on the metadata page based upon, at least in part, the flush request lock queue may include determining, at each node of the multi-node storage system, whether a destage request for the metadata page is being processed on the node based upon, at least in part, the flush request lock queue; in response to determining that the destage request for the metadata page is being processed on at least one node, waiting until the destage request is cleared from the flush request lock queue; and in response to determining that the destage request for the metadata page is not being processed on any node, processing, via one node of the multi-node storage system, the commit request. The flush request may be a request to destage the metadata page to the storage array, thus defining a destage request. Processing, via the multiple nodes of the multi-node storage system, the one or more flush requests on the metadata page based upon, at least in part, the flush request lock queue may include reading the metadata page from the storage array; determining a current tablet identifier for the metadata page; and processing the destage request based upon, at least in part, the current tablet identifier for the metadata page. Processing the destage request based upon, at least in part, the current tablet identifier for the metadata page may include: skipping the destage request when the current tablet identifier for the metadata page indicates that the metadata page read from the storage array is newer than the metadata data page to destage; and processing the destage request when the current tablet identifier for the metadata page indicates that the metadata page read from the storage array is older than the metadata data page to destage. A failure of at least one node of the multi-node storage system may be determined. Flush requests for each metadata page referenced within the flush request lock queue may be paused. Each metadata page referenced within the flush request lock queue may be flushed from a non-volatile storage area to the storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
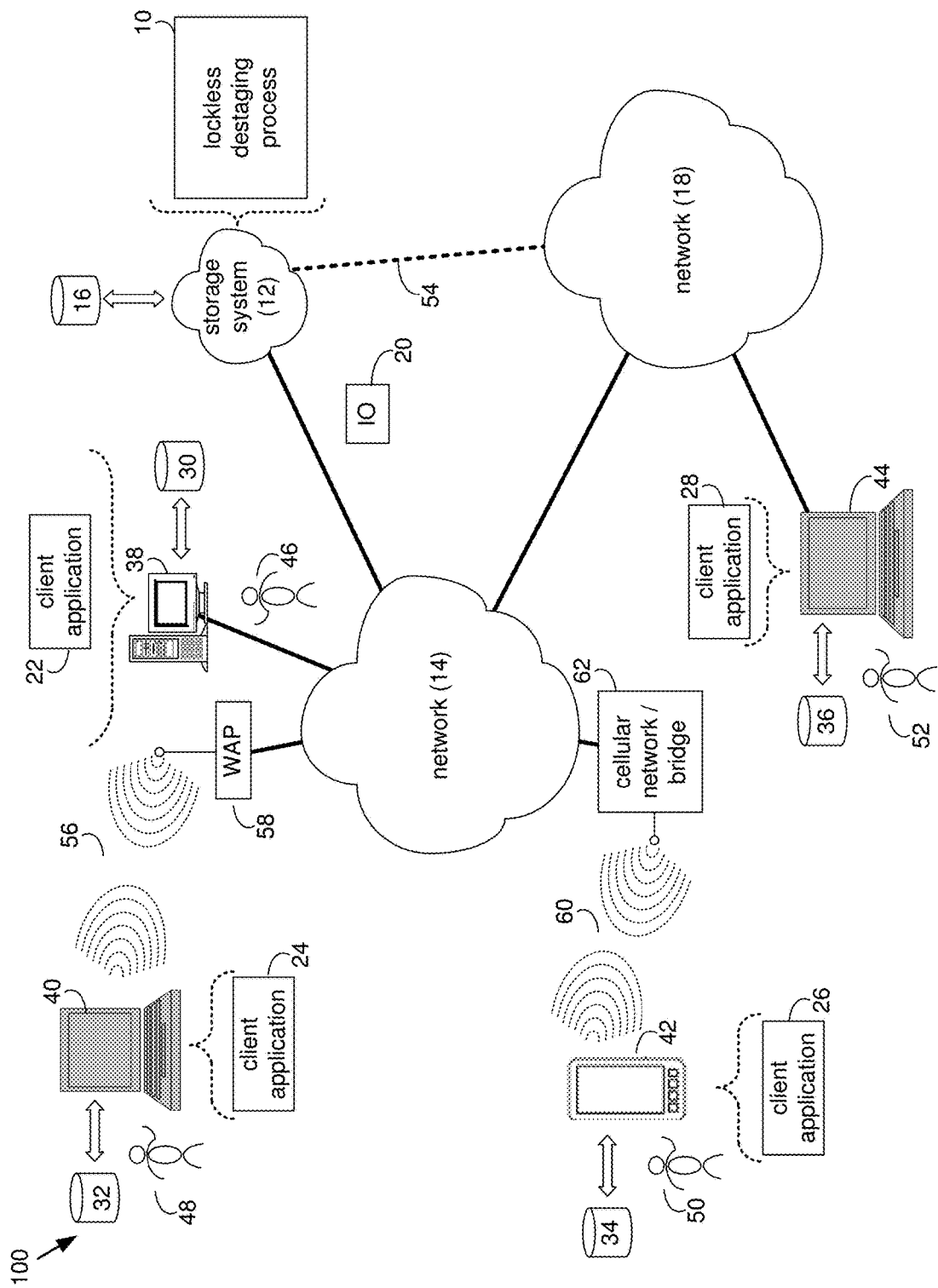
FIG. 1 is an example diagrammatic view of a storage system and a lockless destaging process coupled to a distributed computing network according to one or more example implementations of the disclosure.

Referring to FIG. 1, there is shown lockless destaging process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of lockless destaging process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of lockless destaging process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a lockless destaging process, such as lockless destaging process 10 of FIG. 1, may include but is not limited to, receiving a flush request for a metadata page stored in a storage array of a multi-node storage system. The flush request may be queued on a flush request lock queue on at least one node of the multi-node storage system. One or more flush requests may be processed, via multiple nodes of the multi-node storage system, on the metadata page based upon, at least in part, the flush request lock queue.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
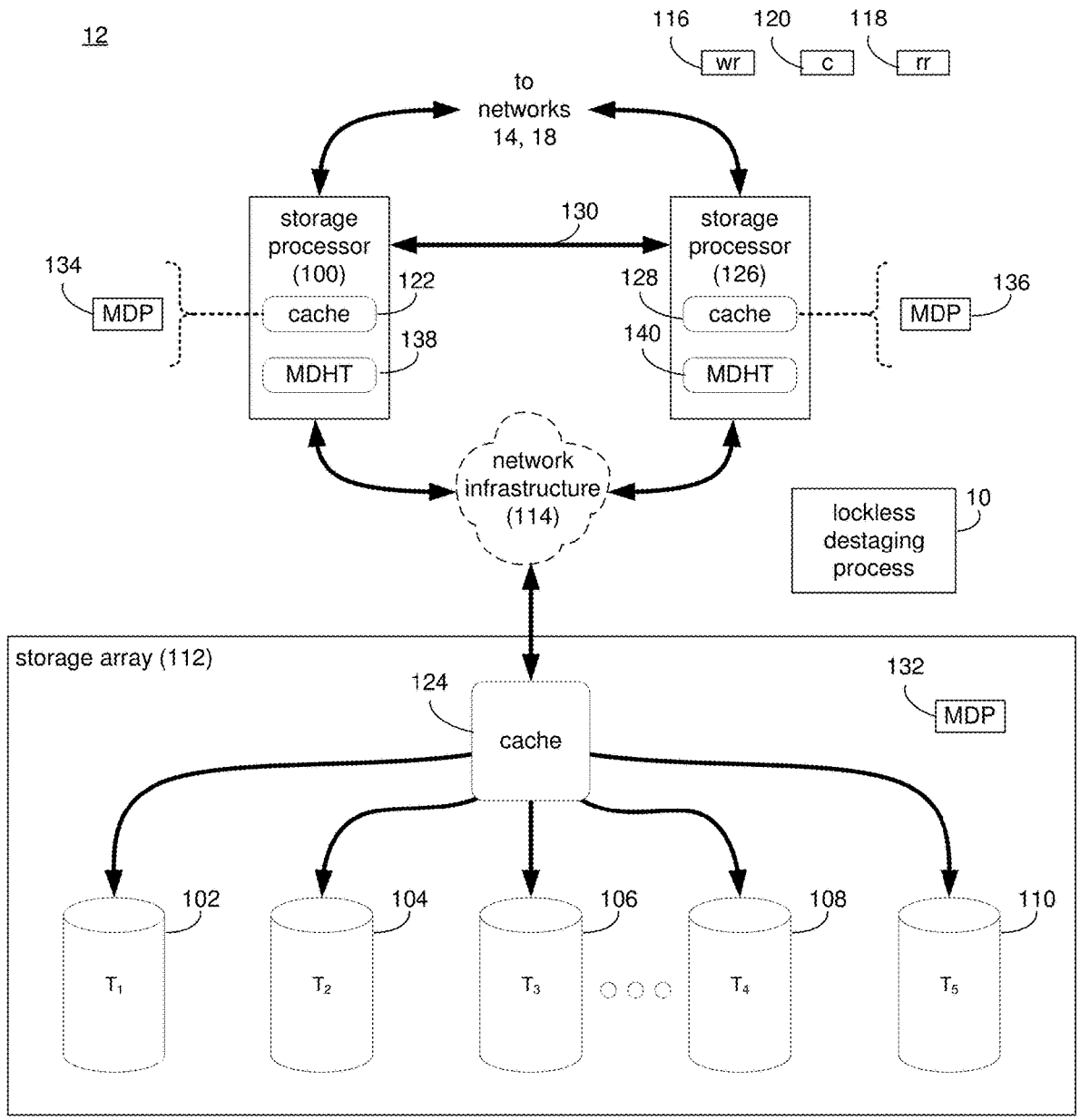
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of lockless destaging process 10. The instruction sets and subroutines of lockless destaging process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of lockless destaging process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of lockless destaging process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of lockless destaging process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
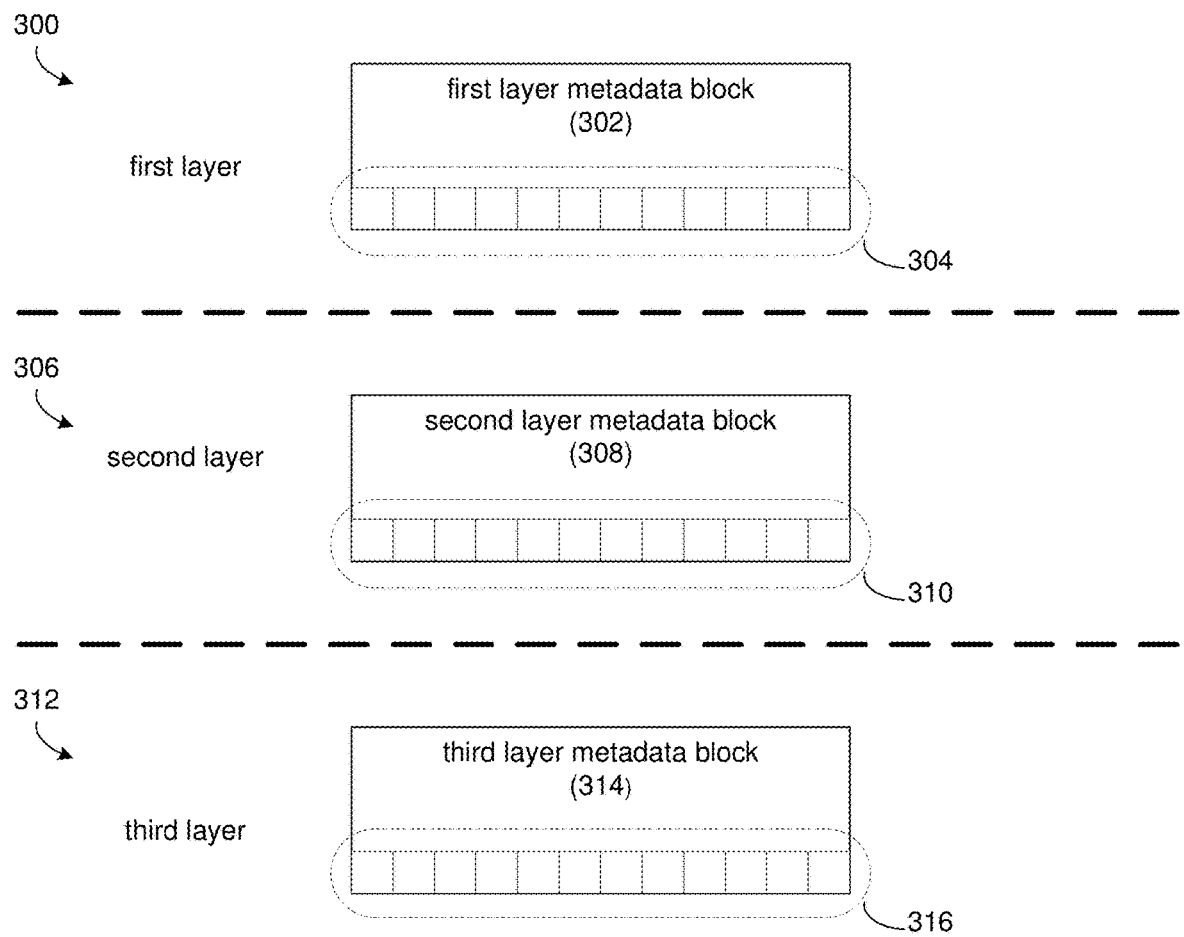
Figure 4:
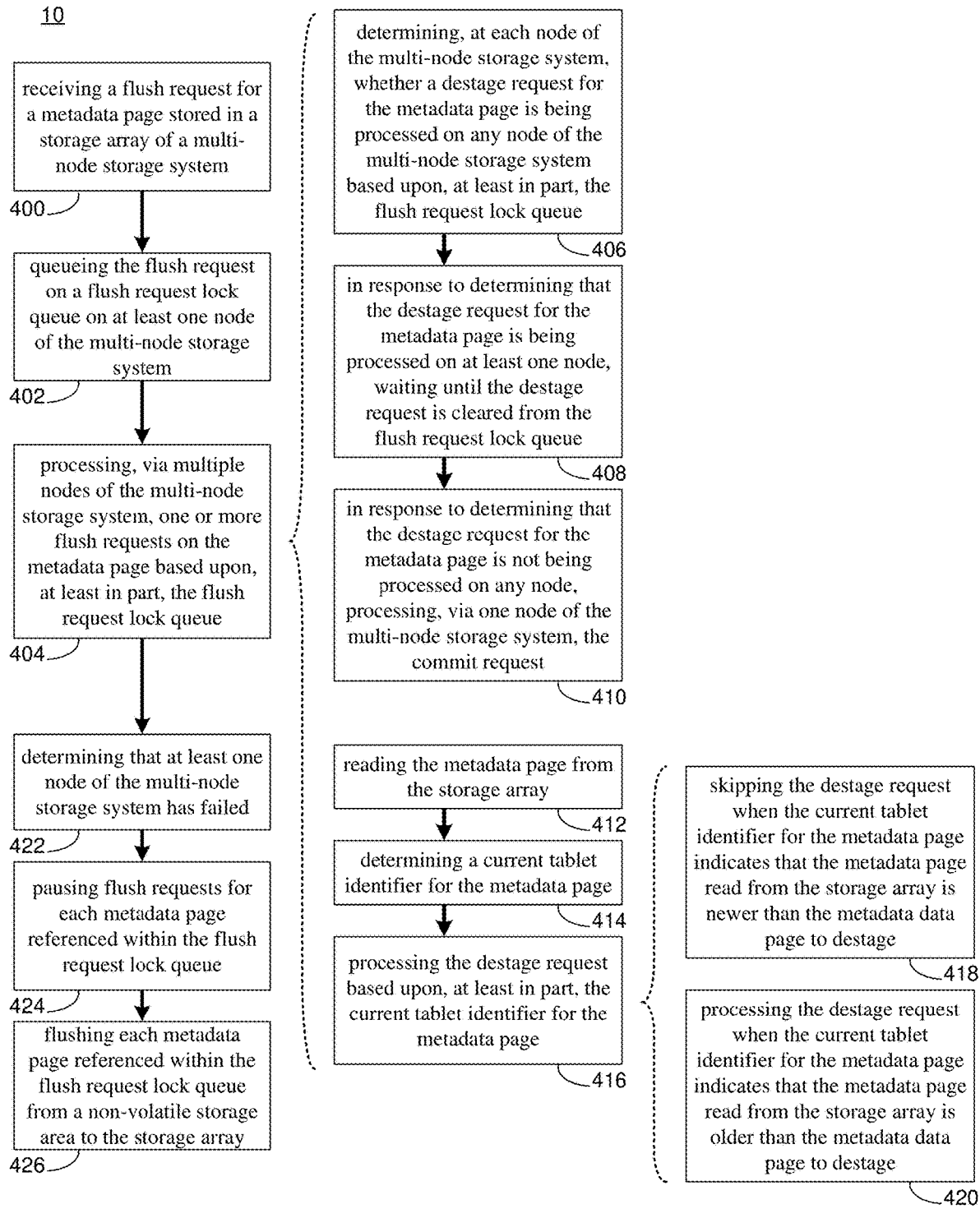
FIG. 4 is an example flowchart of the lockless destaging process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one. As will be discussed in greater detail below, second layer metadata blocks (e.g., second layer metadata block 308) may be stored in a storage array (e.g., on one of storage targets 102, 104, 106, 108 of storage array 112).

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Lockless Destaging Process:

Referring also to FIGS. 4-11 and in some implementations, lockless destaging process 10 may receive 400 a flush request for a metadata page stored in a storage array of a multi-node storage system. The flush request may be queued 402 on a flush request lock queue on at least one node of the multi-node storage system. One or more flush requests may be processed 404, via multiple nodes of the multi-node storage system, on the metadata page based upon, at least in part, the flush request lock queue.

In some implementations, lockless destaging process 10 may allow for synchronization of flush requests or operations (i.e., destage requests, commit requests, etc.) on metadata pages within a multi-node storage system without requiring a lock on the cache memory system (e.g., TxCache) during destage requests. For example, conventional approaches for synchronizing read hit operations, commit operations, and destage operations include applying locks on the cache memory system while performing the respective operation. With a read hit operation, conventional approaches: obtain a lock on the cache memory system; read the metadata page specified by a read request from the cache memory system; and release the lock on the cache memory system. With a commit operation, conventional approaches: obtain a lock on the cache memory system; flush the metadata page from the cache memory system to a storage array; and release the lock on the cache memory system. With a destage operation, conventional approaches: obtain a lock on the cache memory system; read the metadata page to destage from the storage array; apply one or more metadata updates to the metadata page; flush the metadata page to the storage array; and release the lock on the cache memory system. In this manner, conventional approaches require cache memory system locks for each of these operations.

However and as will be discussed in greater detail below, destage operations may be detached from the cache memory system. For example, destage operations may not destage an up-to-date metadata page and may not update to the cache memory system. Accordingly and as will be discussed in greater detail below, a destage operation, which flushes an "old" version of a metadata page, may be configured by lockless destaging process 10 to no longer block read operations from the cache memory system (e.g., TxCache). For example and as discussed above, conventional approaches may include obtaining and releasing a lock on the cache memory system during destage operations which may block read operations.

As will be discussed in greater detail below, destage operations may need to be synchronized with commit operations across multiple nodes of a multi-node storage system. For example, it is possible for the same metadata page to be updated by applying new metadata updates (e.g., with a destage operation) and/or by flushing an up-to-date version of the metadata page (e.g., with a commit operation). Without synchronization, the following problems may be observed: 1) different destage or commit operations from multiple nodes may update the metadata page in the storage array simultaneously, creating non-consistent metadata page; and 2) a newer version of a metadata page flushed by a commit operation may be overwritten by an older, stale version of a metadata page when flushed by a destage operation.

However, obtaining a lock on the cache memory system for flush operations may also block read operations from the cache memory system. Accordingly, using a cache memory system lock to synchronize destage and commit operations according to conventional approaches may introduce contention with read operations and may increase IO latency and decreases system performance overall. As will be discussed in greater detail below, implementations of the present disclosure may allow destage operations to be processed in a multi-node storage system without requiring a lock on the cache memory system.

In some implementations, lockless destaging process 10 may receive, at a node of a multi-node storage system, one or more updates or deltas to a metadata page. As discussed above and in some implementations, a metadata page may generally include a reference to a physical location of user data within a storage array. Referring again to the example of FIG. 3 and in some implementations, a metadata page (e.g., second layer metadata block 308) may encapsulate the physical location of user data and allow relocation without updating first layer metadata blocks (e.g., first layer metadata block 302). Accordingly, the terms "metadata block", "metadata page", and "second layer metadata block" may be used interchangeably throughout the present disclosure.

Referring again to the example of FIG. 2, suppose a node (e.g., storage processor 100) receives one or more updates to a metadata page (e.g., metadata page 132). As discussed above, metadata pages may be stored in a storage array (e.g., storage array 112) and cached copies of the metadata pages may be temporarily stored in cache memory systems of nodes coupled to the storage array (e.g., metadata page 134 in cache memory system 122 of storage processor 100 and metadata page 136 in cache memory system 128 of storage processor 126, where each of metadata pages 134, 136 are cached copies of metadata page 132). While the example of FIG. 2 shows a cached copy of metadata page 132 in both cache memory systems 122, 128 of storage processors 100, 126, it will be appreciated that each storage processor may or may not have a cached copy of a metadata page within its cache memory system at a given time. For example, suppose metadata page 134 is invalidated. In this example, storage processor 100 would need to re-cache a copy of metadata page 132 from storage array 112 into cache memory system 122.

In some implementations, lockless destaging process 10 may store one or more metadata deltas associated with the metadata page in a cache memory system of the node. For example, lockless destaging process 10 may store the one or more metadata deltas in a data container associated with a specific metadata page. In some implementations, a data container may generally include a data structure for storing one or more metadata changes or metadata deltas. Each data container or bucket of the one or more data containers or buckets may be associated with a particular metadata page. For example and as will be discussed in greater detail below, each data container may store one or more reference count changes or deltas associated with a particular metadata page or block. The one or more data containers may be stored in volatile memory. Volatile memory may generally include any temporary memory of a storage system. In one example, the memory may include Random Access Memory (RAM) based storage within a storage processor/node (e.g., cache memory system 122). RAM-based memory system may include non-persistent RAM-based storage. As is known in the art, non-persistent RAM-based storage is RAM-based storage that will lose its data in the event of e.g., a power failure. However, it will be appreciated that other forms or types of volatile memory may be used within the scope of the present disclosure.

In some implementations, lockless destaging process 10 may receive one or more metadata deltas associated with a metadata page. As discussed above, a storage processor (e.g., storage processor 100) may receive an operation that may specify a change to a metadata page within the storage array (e.g., data array 112). Accordingly, the one or more deltas may specify changes to a metadata page in the storage array.

Figure 5:
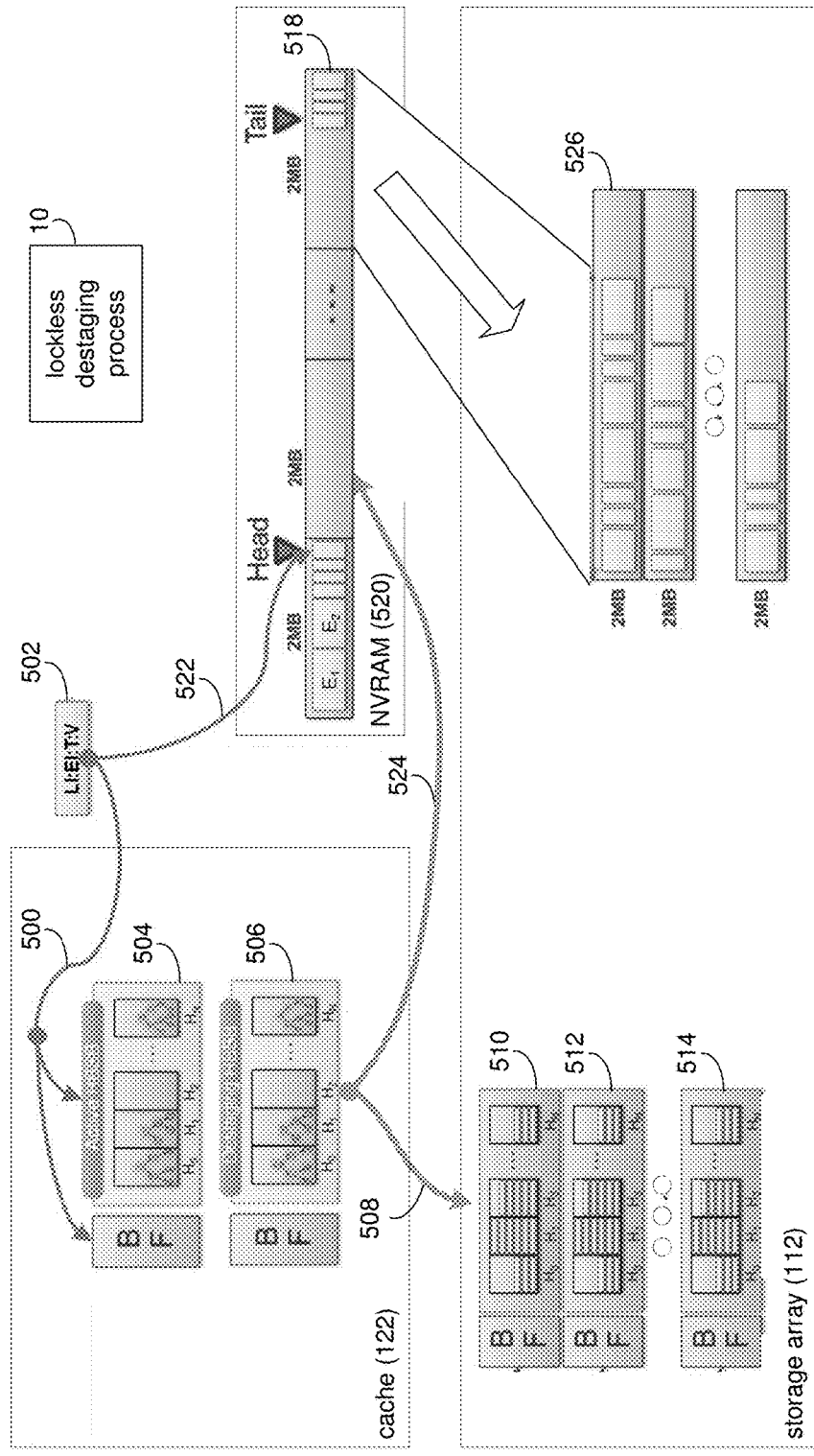
FIGS. 5-11 are example diagrammatic views of the lockless destaging process of FIG. 1 according to one or more example implementations of the disclosure.

Referring also to FIG. 5 and in some implementations, lockless destaging process 10 may route (represented by arrow 500) each metadata delta (e.g., metadata delta 502) to a specific data container or bucket of the one or more data containers. In some implementations, each data container of the one or more data containers (e.g., one or more data containers 504, 506) may be organized as a binary tree of metadata deltas. For example, upon writing the metadata delta to a specific data container, lockless destaging process 10 may sort the metadata deltas based upon, at least in part, an insertion order. In other words, each metadata delta may be sorted in the binary tree structure within the data container based on when the metadata delta was received. While a binary tree structure has been described, it will be appreciated that various sorting algorithms or data structures may be used within the scope of the present disclosure.

In some implementations, lockless destaging process 10 may assign a plurality of unique sequential identifiers to a plurality of tablets in a cache memory system. For example and as shown in FIG. 5, the one or more data containers or buckets may be organized into sets of data containers or "tablets" (e.g., one or more tablets 504, 506). In some implementations, lockless destaging process 10 may assign each tablet a unique sequential identifier. For example, lockless destaging process 10 may utilize a counter, monotonically increasing each time new a tablet is created to assign the tablet with the count. Referring again to the example of FIG. 5, suppose tablets 504, 506 are the e.g., the fourth and fifth tablets generated by storage system 12. In this example, lockless destaging process 10 may assign 400 tablet 504 with a unique sequential identifier of "5" and may assign tablet 506 with a unique sequential identifier of "4". While numerically sequential identifiers are described above, it will be appreciated that any alphanumerical sequence may be used to assign the plurality of unique sequential identifiers to the plurality of tablets within the scope of the present disclosure.

In some implementations, lockless destaging process 10 may write one or more metadata deltas associated with a metadata page stored in a storage array, to the plurality of tablets in the cache memory system. Referring again to FIGS. 2 and 5 and returning to the above example where storage processor 100 receives one or more metadata deltas associated with metadata page 132, lockless destaging process 10 may write one or more metadata deltas (e.g., metadata delta 502) in cache memory system 122. Specifically, lockless destaging process 10 may write the one or more metadata deltas (e.g., metadata delta 502) in one or more data storage containers within a plurality of tablets (e.g., tablets 504, 506). In one example, lockless destaging process 10 may write the one or more metadata deltas (e.g., metadata delta 502) in a data storage container associated with metadata page 132.

In some implementations, lockless destaging process 10 may write the one or more metadata deltas to an active tablet. An active tablet may generally include a tablet with one or more data containers (e.g., a data container for each metadata page). In some implementations, each tablet may have a predefined storage capacity (e.g., as a portion of the total cache memory system size). Accordingly, when the active tablet is full, lockless destaging process 10 may switch the active tablet with an empty tablet. The active tablet may then be destaged to the storage array (i.e., a destaging tablet). As will be discussed in greater detail below, destaging may generally include writing the one or more metadata changes from a set of data containers to the storage array.

For example and as shown in FIG. 5, lockless destaging process 10 may write the one or more metadata deltas (e.g., metadata delta 502) in one or more data storage containers within an active tablet. In one example, suppose tablet 506 is the "active" tablet. In this example, lockless destaging process 10 may write the one or more metadata deltas (e.g., metadata delta 502) in one or more data storage containers within tablet 506. When tablet 506 is full (e.g., based on one or more predefined thresholds for tablet 506), lockless destaging process 10 may switch active tablet 506 with an empty tablet (e.g., tablet 504). In this example, tablet 504 may be the active table for writing 402 the one or more metadata deltas associated with a metadata page and tablet 506 may be the destaging tablet. In some implementations, metadata change aggregation process 10 may write one or more subsequent metadata changes to active tablet 504.

In some implementations, lockless destaging process 10 may write each metadata delta stored in at least one tablet of the plurality of tablets, to the metadata page stored in the storage array, thus defining one or more destage tablets. For example, writing the one or more metadata deltas stored in at least one tablet of the plurality of tablets to the storage array may include writing or flushing the at least one tablet to the storage array. For example and referring again to the example of FIG. 5, lockless destaging process 10 may write (represented with arrow 508) the destaging tablet (e.g., tablet 506) to the storage array (e.g., data array 112). In this manner, lockless destaging process 10 may aggregate multiple destage tablets (e.g., destage tablets 510, 512, 514) within data array 112 before writing the one or more metadata updates to the metadata page.

As discussed above and in some implementations, the destage tablets may include a plurality of data container pages that have a pre-defined size of a metadata page (e.g., 4 KB). Similar to the set of data containers stored in the cache memory system, each tablet of delta container pages may have a delta container page associated with a respective metadata page. In some implementations, a delta container page may sort the one or more metadata changes for a particular metadata page by insertion time. In some implementations, a set of tablets (e.g., tablets 510, 512, 514) may be organized in a storage array (e.g., storage array 112) as a ring buffer. For example, a tablet may be added to a "head" of the ring buffer (e.g., ring buffer 516) and released or deleted from a "tail" of the ring buffer. The process of releasing or deleting tablet will be described in greater detail below.

In some implementations, lockless destaging process 10 may write the one or more metadata deltas to a metadata log in non-volatile memory. Referring again to the example of FIG. 5 and in some implementations, lockless destaging process 10 may generate a metadata log (e.g., metadata log 518) in non-volatile memory (e.g., non-volatile Random Access Memory (NVRAM) 520). In some implementations, the metadata log may store (indicated by arrow 522) metadata deltas in time order (e.g., sorted oldest to newest). In some implementations, the contents (e.g., metadata delta 502) of the may preserved in the event of a power failure or other failure of the cache memory system. In some implementations and in response to the failure of the cache memory system, lockless destaging process 10 may recover the one or more metadata deltas from the metadata log (e.g., metadata log 518).

In some implementations and in response to destaging or writing the one or more metadata deltas to the storage array (e.g., writing the tablets from the cache memory system to the storage array), lockless destaging process 10 may release or free (indicated by arrow 524) the corresponding part of the metadata log (e.g., metadata log 518). In some implementations, lockless destaging process 10 may determine that the metadata log (e.g., metadata log 518) is full and may write at least a portion of the one or more metadata deltas stored in the metadata log to the storage array (e.g., data array 112). In some implementations, the at least a portion of the one or more metadata deltas written to the storage array may be stored as e.g., 2 MB chunks (e.g., data chunk 526) in the storage array (e.g., storage array 112). While a 2 MB chunk has been discussed, it will be appreciated that the at least a portion of the one or more metadata deltas may be stored in various chunks or blocks of varying sizes.

In some implementations, lockless destaging process 10 may aggregate the one or more metadata deltas and write the one or more metadata deltas to the metadata page. For example, lockless destaging process 10 may combine a plurality of metadata deltas associated with a metadata page from the destage tablets in the storage array. Referring also to the example of FIG. 6, lockless destaging process 10 may combine a delta container page associated with a particular metadata page from at least one tablet (e.g., destage tablets 600, 602, 604, 606), thus defining a batch (e.g., batches 608, 610, 612, 614). As discussed above, suppose lockless destaging process 10 previously assigned 400 unique sequential identifiers to tablets 600, 602, 604, 606 (e.g., "1" for tablet 600; "2" for tablet 602; "3" for tablet 604; and "4" for tablet 606).

Figure 6:
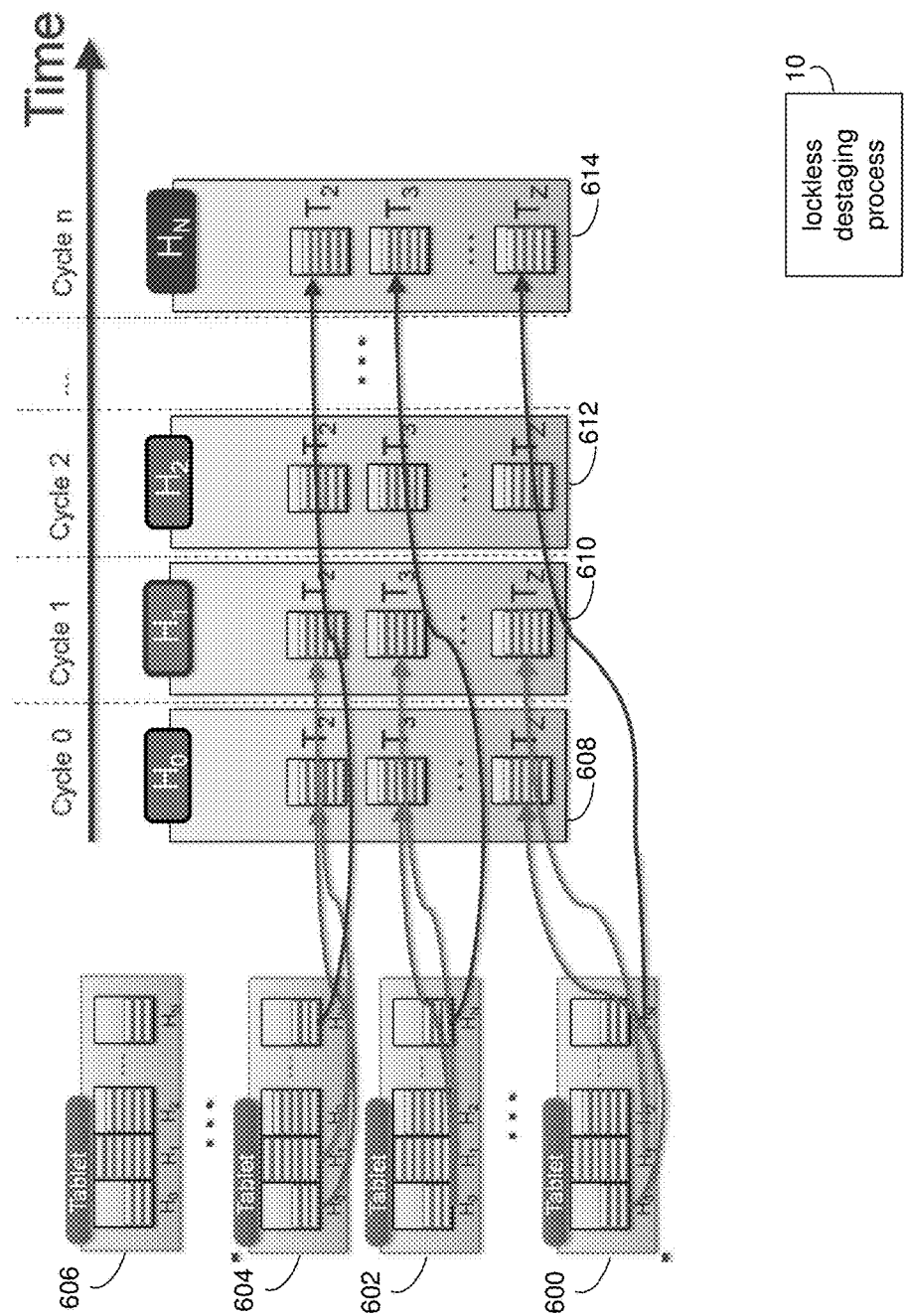

As shown in the example of FIG. 6, destage tablets 600, 602, 604, 606 may include metadata deltas associated with (in this example) four metadata pages. Accordingly, lockless destaging process 10 may combine the metadata deltas from each of the destage tablets (e.g., destage tablets 600, 602, 604, 606) for each metadata page to define a batch for each metadata page (e.g., batches 608, 610, 612, 614). In some implementations, lockless destaging process 10 may generate one batch per cycle. While a single batch per cycle has been described, it will be appreciated that any number of batches may be generated per any number of cycles.

Figure 7:
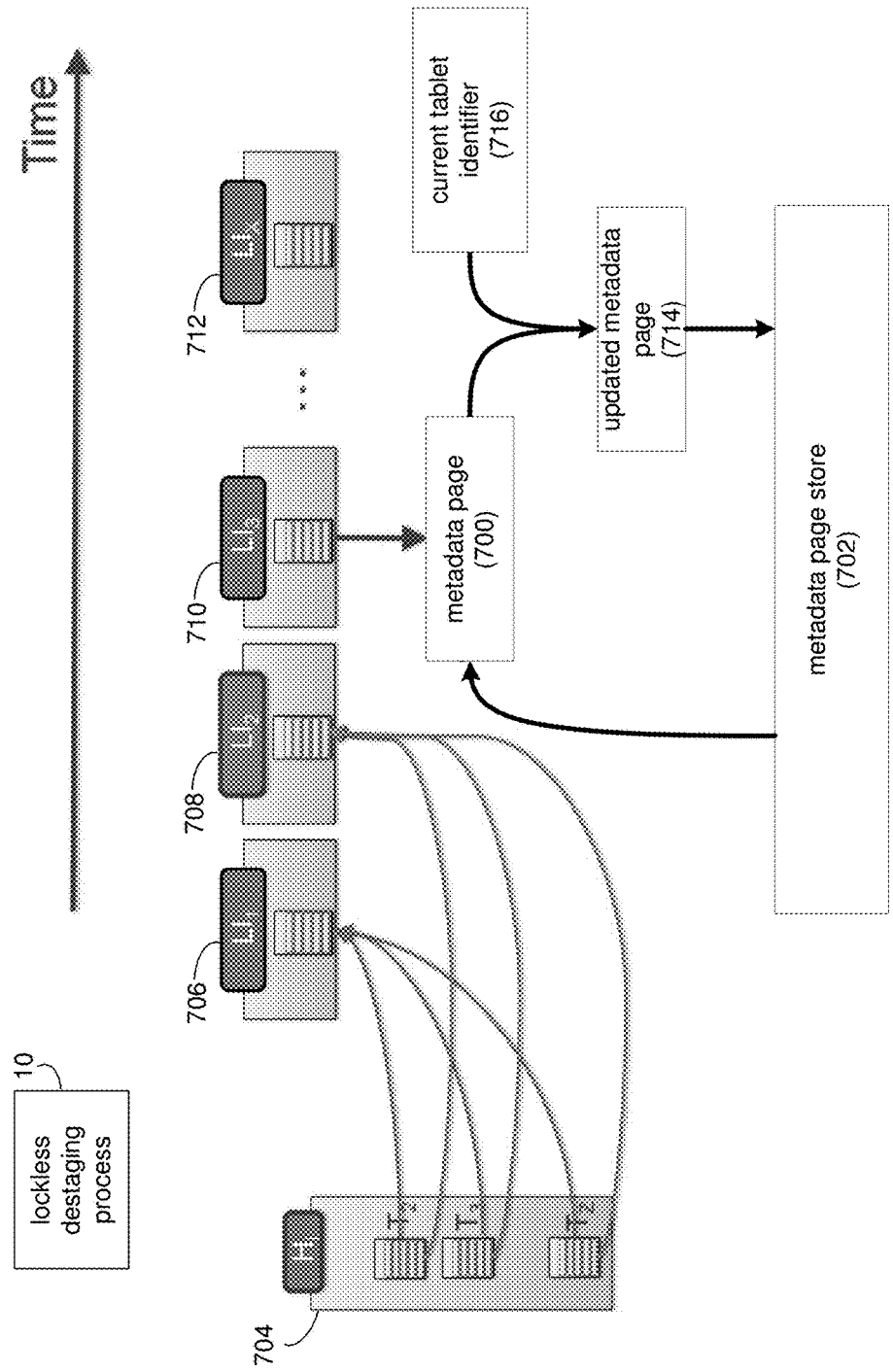

Referring also to the example of FIG. 7 and in some implementations, lockless destaging process 10 may read the metadata page from the storage array. In some implementations, the metadata page (e.g., metadata page 700 as shown in FIG. 7) may be read from a metadata page store (e.g., metadata page store 702) on the storage array (data array 112). In some implementations, lockless destaging process 10 may merge the one or more metadata deltas from the batches of FIG. 6 and the metadata page read from the storage array, thus defining an updated metadata page. As shown in FIG. 7 and in some implementations, lockless destaging process 10 may sort the first portion of the one or more metadata deltas from a plurality of batches (e.g., batch 704) by time, thus defining an aggregated list of metadata deltas (e.g., aggregated lists 706, 708, 710, 712) for each metadata page. In response to sorting the one or more metadata deltas from the batches to define the aggregated list, lockless destaging process 10 may merge the aggregated list (e.g., aggregated list 710) and the metadata page read from the storage array (e.g., metadata page 700) to generate an updated metadata page (e.g., updated metadata page 714). In some implementations, lockless destaging process 10 may write the updated metadata page to the storage array (including the first portion of the one or more metadata deltas).

In some implementations, lockless destaging process 10 may write a largest unique sequential identifier from the plurality of unique sequential identifiers assigned to the one or more destage tablets, to the storage array, thus defining a current tablet identifier for the metadata page. For example and referring again to FIGS. 6-7, suppose batch 704 only includes metadata deltas from tablets 600 and 602. In other words, suppose the update to metadata page 700 only includes metadata deltas associated with metadata page 700 from destage tablets 600 and 602. In this example, lockless destaging process 10 may write the largest unique sequential identifier from the plurality of unique sequential identifiers assigned to the one or more destage tablets, to the storage array. For example, lockless destaging process 10 may determine that the largest unique sequential identifier for the destage tablets written to batch 700 is e.g., "2" for tablet 602 (e.g., current tablet identifier 716 for metadata page 714). Accordingly, lockless destaging process 10 may write current tablet identifier 716 (e.g., "2" for tablet 602) to data array 112. In some implementations, lockless destaging process 10 may write the current tablet identifier to a portion of metadata page 714 (e.g., the combination of metadata page 700 and the one or more metadata deltas from batch 700). However, it will be appreciated that current tablet identifier 716 may be written to any accessible portion of data array 112 within the scope of the present disclosure.

In some implementations, the current tablet identifier (e.g., current tablet identifier 716) may indicate the exact scope of metadata deltas included in a metadata page. In other words, the current tablet identifier may indicate that the metadata page includes all metadata deltas up to and including the tablet with the current tablet identifier and does not contain any metadata deltas for the next tablet (e.g., the next destage tablets) and further. Accordingly, by recording the current tablet identifier, lockless destaging process 10 may eliminate the need to synchronize read operations with destaging operations. As will be discussed in greater detail below, lockless destaging process 10 may "build" a metadata page from deltas waiting to be destaged and the copy of the metadata page stored in the array without locking access to the metadata page.

Figure 8:
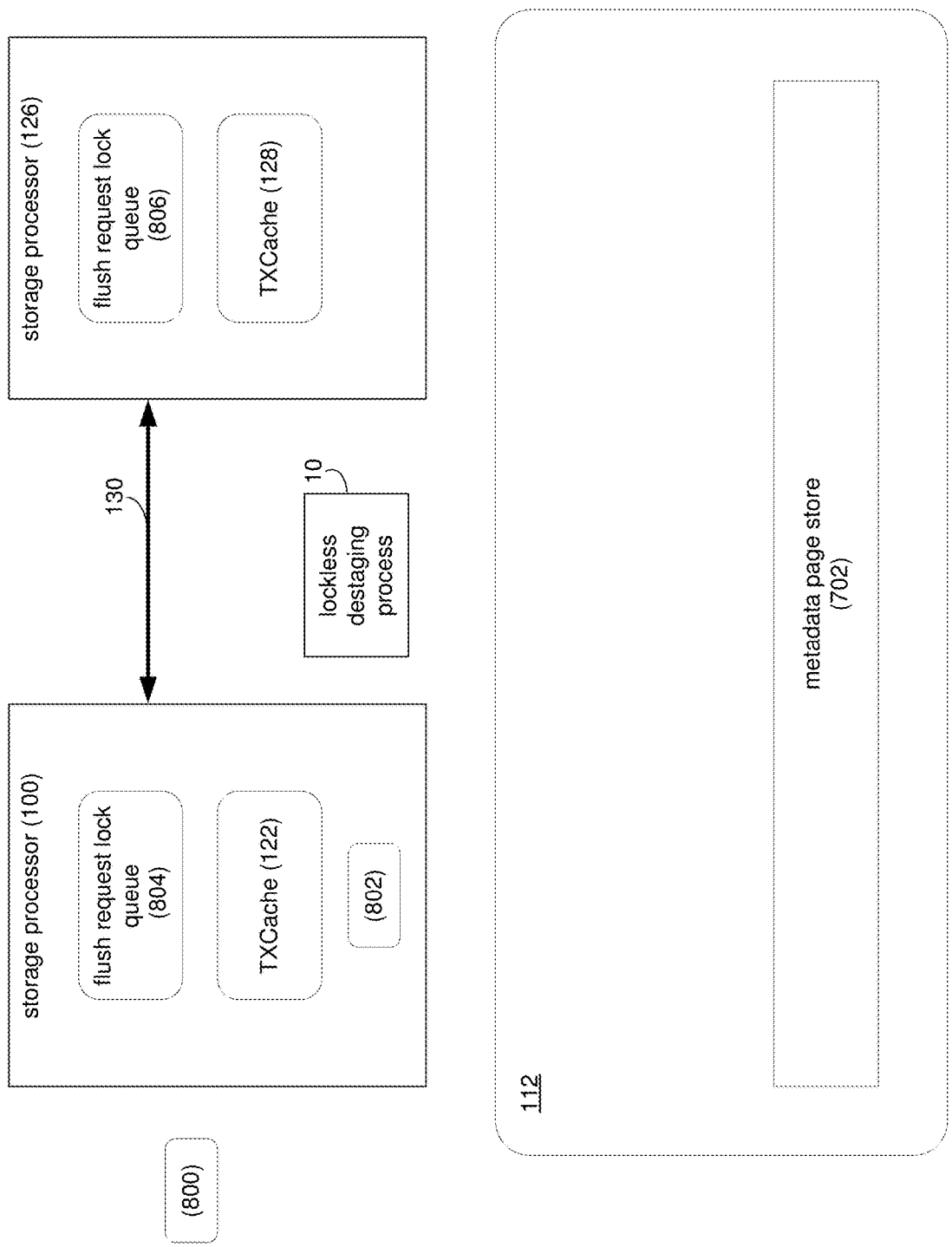

In some implementations, lockless destaging process 10 may receive 400 a flush request for a metadata page stored in a storage array of a multi-node storage system. As will be discussed in greater detail below, a flush request may generally include request to perform an operation to update a metadata page stored in persistent memory (e.g., metadata page store 702 of data array 112). Examples of a flush request may generally include a destage request, a commit request, etc. Referring also to FIG. 8, suppose lockless destaging process 10 receives 400 a flush request (e.g., flush request 800) for a metadata page (e.g., metadata page 802) stored in data array 112 of storage system 12. In some implementations, flush request 800 may specify a metadata page (or multiple metadata pages) to flush to data array 112.

Figure 9:
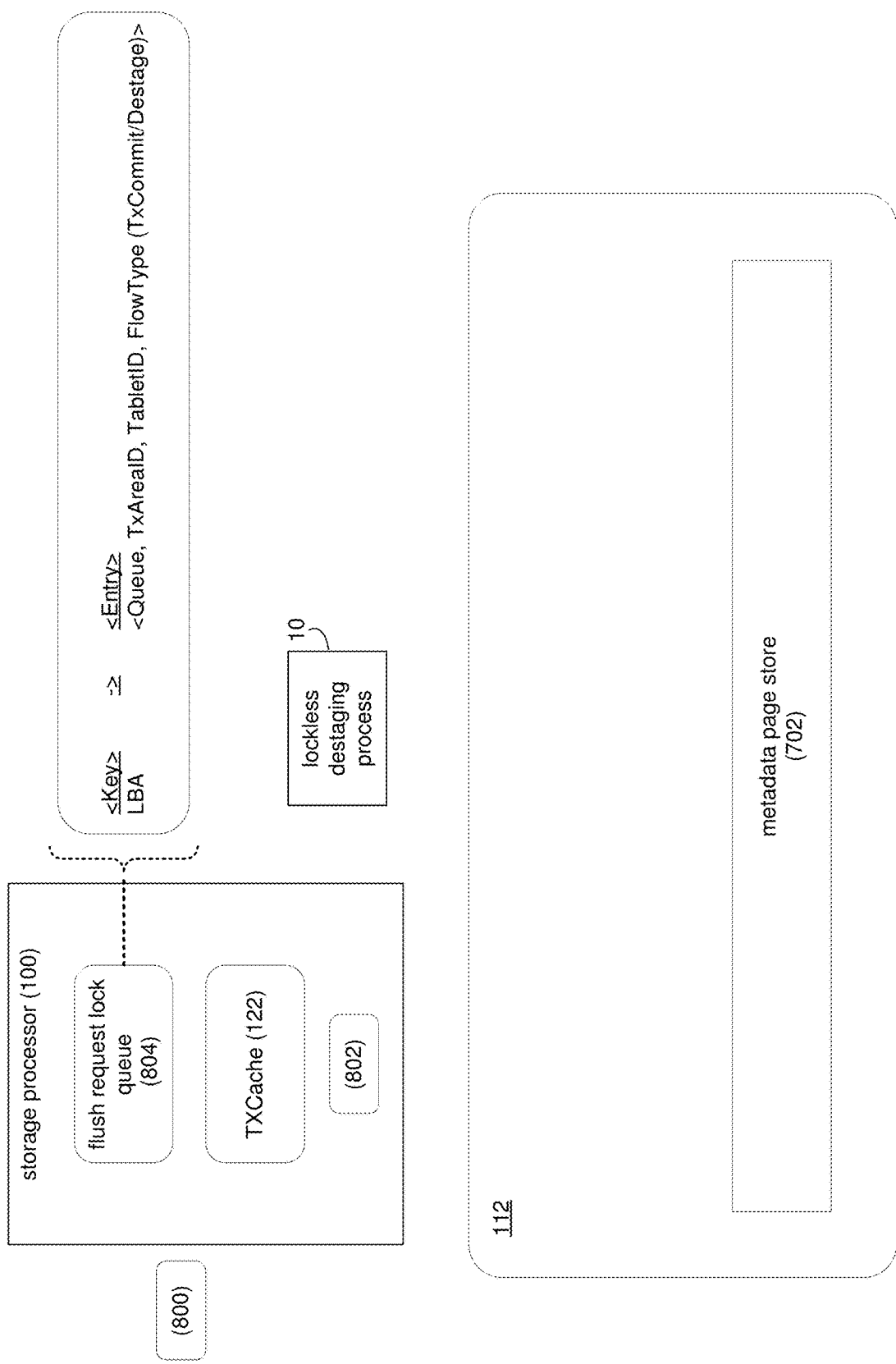
Figure 10:
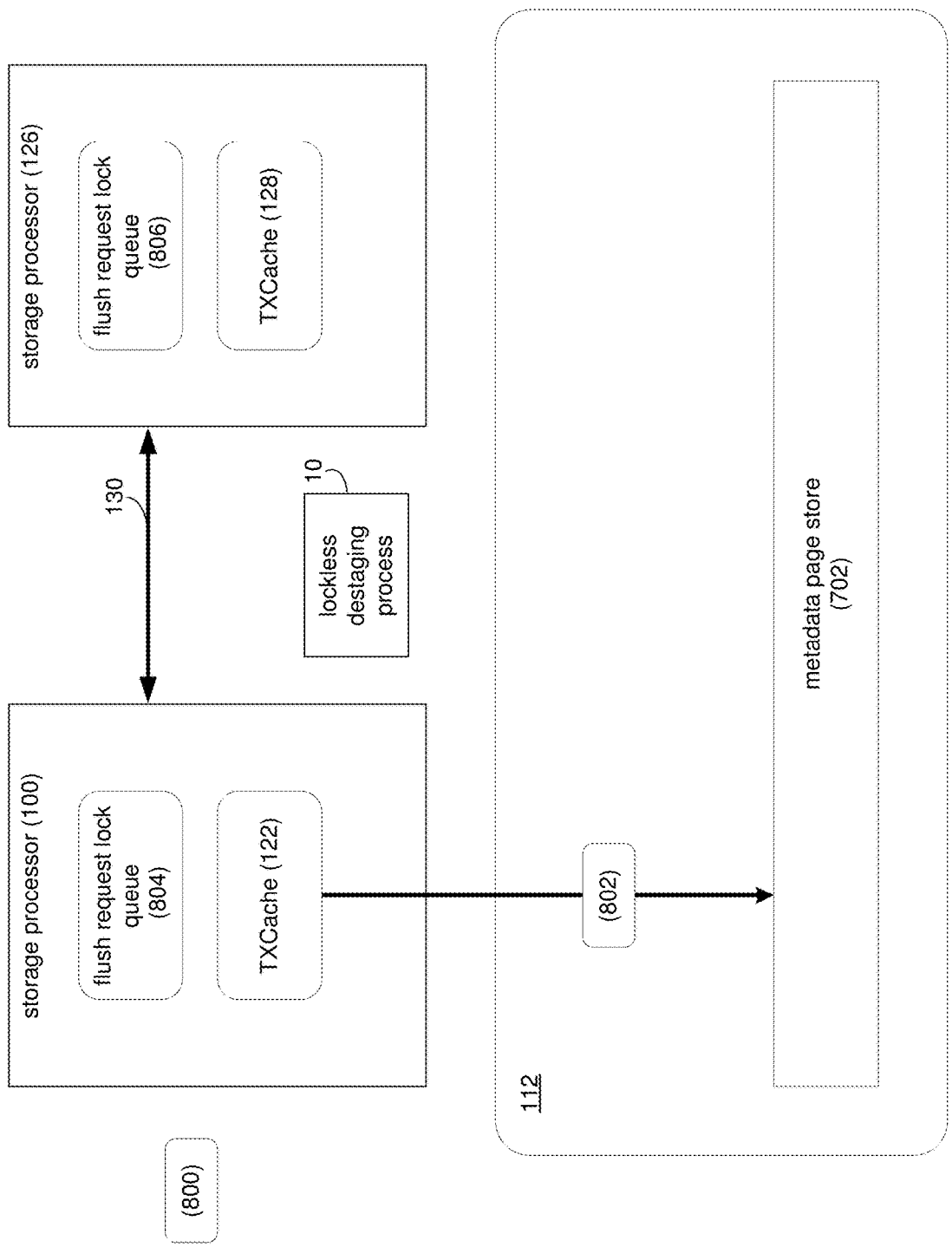

In some implementations, lockless destaging process 10 may queue 402 the flush request on a flush request lock queue on at least one node of the multi-node storage system. A flush request lock queue may generally include a hash table describing a pool of locks. For example and as shown in FIG. 9, a flush request lock queue may include a one or more locks with a "key" referencing a Logical Block Address (LBA) or metadata page and an "entry" referencing various fields associated with the metadata page. For example and as shown in FIG. 9, a "queue" field may reference a wait queue for another operation to the metadata page; a "TabletID" may reference the current tablet identifier for the metadata page (as discussed above); a flush operation type (e.g., a commit operation (e.g., "TxCommit"), a destage operation, etc.); and a "TxAreaID" field may reference a last portion of NVRAM used to flush the metadata page.

In some implementations, a "TXArea" may reference the transactional area on NVRAM that a metadata page is flushed to prior to flushing to disk. For example, a node may fail during the flush operation, leaving the metadata page within data array 112 partially overwritten. In this case, a peer node may be required to redo the flush operation. Accordingly, the TxAreas on NVRAM may be distinguished by a unique identifier (e.g., "TxAreaID"). In some implementations, each node may have its own TxAreaID's, meaning that given an TxAreaID, a particular node of the multi-node storage system may be identified. While the above example includes e.g., four fields for each entry of a flush request lock queue, it will be appreciated that lockless destaging process 10 may generate flush request lock queue with any number of fields within the scope of the present disclosure.

Referring again to FIG. 2, lockless destaging process 10 may generate a flush request lock queue on at least one node of the multi-node storage system (e.g., flush request lock queue 804 on node 100 (e.g., storage processor 100) and flush request lock queue 806 on node 126 (e.g., storage processor 126)). While an example of e.g., two flush request lock queues has been described, it will be appreciated that any number of flush request lock queues may be generated within the scope of the present disclosure.

Returning to the above example, suppose lockless destaging process 10 receives 400 flush request 800 for flushing metadata page 802 to data array 112. In this example, lockless destaging process 10 may determine the type of flush operation for flush request 800. For example and as discussed above, flush operations may include, but are not limited to, destage operations, commit operations, etc. As will be discussed in greater detail below, with flush request lock queue 804, lockless destaging process 10 may process 404 destage requests differently than commit requests to allow destage operations and commit requests to be synchronized without locking the cache memory system during destage operations.

In some implementations, the flush request may be a request to commit the metadata page from a cache memory system to the storage array, thus defining a commit request. Returning to the above example, suppose lockless destaging process 10 determines that flush request 800 is a request to commit the metadata page (e.g., metadata page 802) from cache memory system 122 to data array 112. In this example, lockless destaging process 10 may queue 402 the flush request on a flush request lock queue on at least one node of the multi-node storage system. For example, because flush request 800 is a commit request, lockless destaging process 10 may queue flush request 800 on a flush request lock queue on each node of the multi-node storage system. In this example, lockless destaging process 10 may queue 402 flush request 800 on flush request lock queue 804 on node 100 and on flush request lock queue 806 on node 126. In this manner, a flush request lock queue on each node of multi-node storage system 12 may include flush request 800 for committing metadata page 802 to data array 112.

In some implementations, lockless destaging process 10 may process 404, via multiple nodes of the multi-node storage system, one or more flush requests on the metadata page based upon, at least in part, the flush request lock queue. For example and as discussed above, lockless destaging process 10 may utilize the flush request lock queues on each node of the multi-node storage system to process 404 destage requests differently than commit requests. In this manner, lockless destaging process 10 may allow destage operations and commit requests to be synchronized without locking the cache memory system on each node of the multi-node storage system and/or without signaling another node during destage operations.

In some implementations, processing 404, via the multiple nodes of the multi-node storage system, the one or more flush requests on the metadata page based upon, at least in part, the flush request lock queue may include determining 406, at each node of the multi-node storage system, whether a destage request for the metadata page is being processed on any node of the multi-node storage system based upon, at least in part, the flush request lock queue. Continuing with the above example, suppose flush request 800 is a request to commit metadata page 802 from cache memory system 122/128 to data array 112. In this example, lockless destaging process 10 may process 404 commit request 800 by first obtaining a lock on cache memory system 122 on node 100 (and/or on cache memory system 128 of node 126). Lockless destaging process 10 may determine 406 whether a destage request for the metadata page is being processed on any node (e.g., node 100 or node 126). In this manner, by queuing 402 commit request 800 on each node (e.g., in each flush request lock queue), lockless destaging process 10 may ensure that while a destage request is being processed on any node of the multi-node storage system, no node in the multi-node storage system will overwrite the metadata page in storage array via a commit request while lockless destaging process 10 destages the metadata page to the storage array.

In some implementations, lockless destaging process 10 may, in response to determining that the destage request for the metadata page is being processed on at least one node, wait 408 until the destage request is cleared from the flush request lock queue. For example, suppose commit request 800 is received during or after a destage request for the same metadata page is being processed by at least one node of the multi-node storage system. In this example, because a commit request performed by another node could cause data consistency issues on the metadata page, lockless destaging process 10 may utilize the flush request lock queue to synchronize flush requests being performed on a metadata page by multiple nodes.

In some implementations, lockless destaging process 10 may, in response to determining that the destage request for the metadata page is not being processed on any node, process 410 the commit request via one node of the multi-node storage system. Returning to the above example and referring also to FIG. 10, suppose that lockless destaging process 10 determines 406 that no destage request for the metadata page is being processed on any node by referencing flush request lock queue 804/flush request lock queue 806. In this example, lockless destaging process 10 may process 410 commit request 800 on one node of the multi-node storage system. For example, lockless destaging process 10 may process 410 commit request 800 by committing, via node 100, metadata page 802 to metadata page store 702 of data array 112. In some implementations and in response to committing metadata page 802 to metadata page store 702, node 100 may clear the entry associated with commit request 800 from flush request lock queue 804 and/or flush request lock queue 806 and may "wake up" the next flush request within flush request lock queue 804. In some implementations, after metadata page 802 is committed to metadata page store 702, lockless destaging process 10 may release the lock on cache memory system 122/128.

Figure 11:
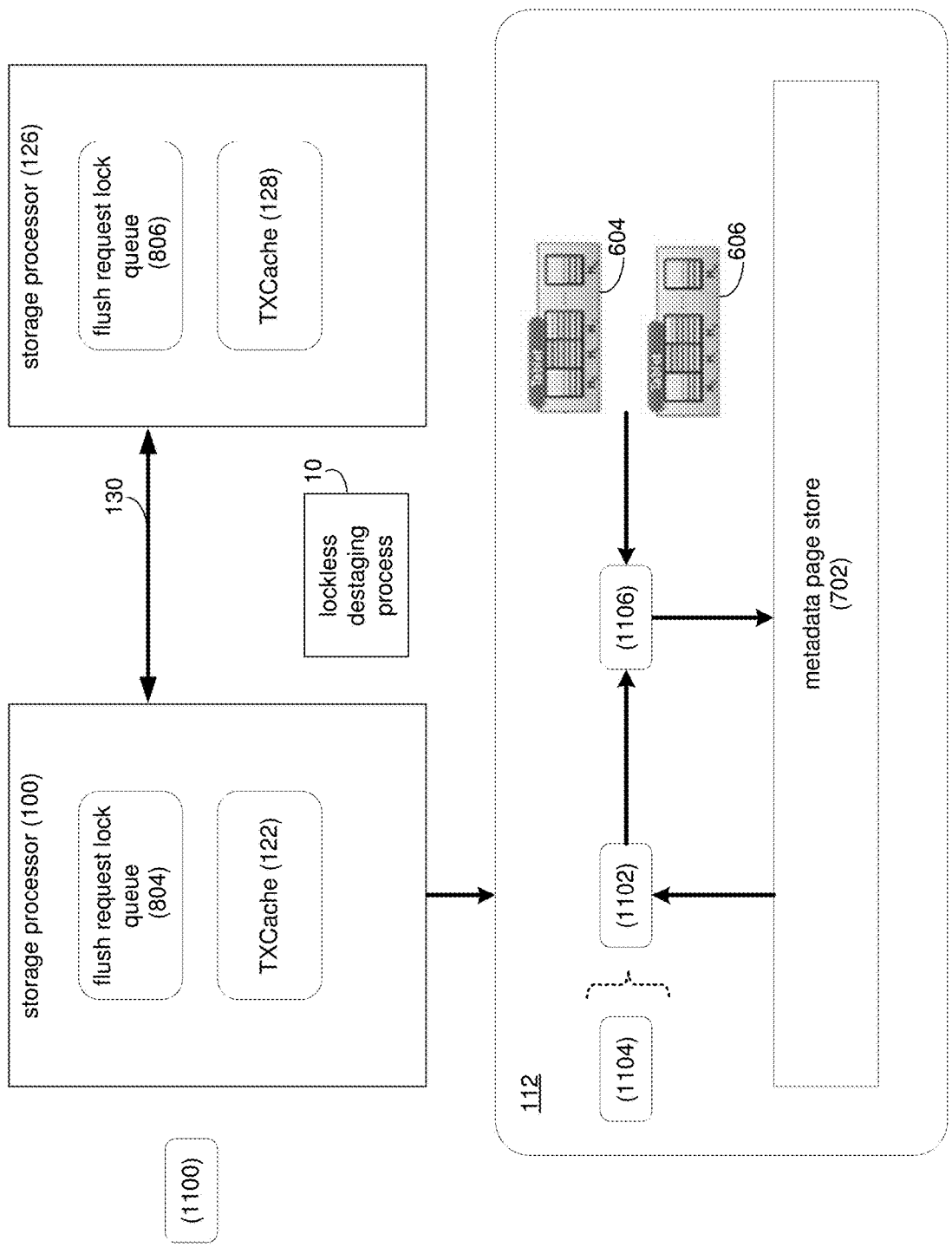

In some implementations, the flush request may be a request to destage the metadata page to the storage array, thus defining a destage request. Referring also to FIG. 11 and in some implementations, suppose lockless destaging process 10 determines that flush request 1100 is a request to destage the metadata page (e.g., metadata page 1102) to data array 112. In this example, lockless destaging process 10 may queue 402 the flush request on a flush request lock queue on at least one node of the multi-node storage system. For example, because flush request 1100 is a destage request, lockless destaging process 10 may queue flush request 1100 on a flush request lock queue on one node of the multi-node storage system. In this example, lockless destaging process 10 may queue 402 flush request 1100 on flush request lock queue 804 on node 100.

In some implementations, lockless destaging process 10 may determine whether a commit request for the metadata page is being processed on any node of the multi-node storage system based upon, at least in part, the flush request lock queue. Continuing with the above example, suppose flush request 1100 is a request to destage metadata page 1102 to data array 112. In this example, lockless destaging process 10 may process 404 destage request 1100 by determining whether a commit request for the metadata page is being processed on the node. In this manner, by queuing 402 destage request 1100 on the node performing the destaging, lockless destaging process 10 may ensure that while a commit request is being processed by the node, the destage request may be paused or paused until lockless destaging process 10 determines whether the commit request has provided a newer version of the metadata page to the storage array.

In some implementations, lockless destaging process 10 may, in response to determining that the commit request for the metadata page is being processed on the node, wait until the commit request is cleared from the flush request lock queue. For example, suppose destage request 1100 is received during or after a commit request for the same metadata page is being processed by the same node. In this example, lockless destaging process 10 may wait until the commit request is completed because, and as will be discussed in greater detail below, the commit request may render the destage request moot (i.e., because the committed metadata page is newer than the metadata page to be destaged).

In some implementations, lockless destaging process 10 may, in response to determining that the destage request for the metadata page is not being processed on any node, process 404 the destage request. For example and in some implementations, processing 404, via the multiple nodes of the multi-node storage system, the one or more flush requests on the metadata page based upon, at least in part, the flush request lock queue may include reading 412 the metadata page from the storage array. Referring again to FIG. 11 and in some implementations, lockless destaging process 10 may read 412 metadata page 1102 from metadata page store 702.

In some implementations, processing 404, via the multiple nodes of the multi-node storage system, the one or more flush requests on the metadata page based upon, at least in part, the flush request lock queue may include determining 414 a current tablet identifier for the metadata page. Continuing with the above example and in some implementations, suppose metadata page 1102 was previously flushed to metadata page store 702 with current tablet identifier 1104. In this example, current tablet identifier 1104 may indicate that metadata page 1102 includes all metadata deltas up to and including the tablet with the current tablet identifier and does not contain any metadata deltas for the next tablet.

In some implementations, lockless destaging process 10 may process 416 the destage request based upon, at least in part, the current tablet identifier for the metadata page. For example, lockless destaging process 10 may utilize the current tablet identifier for the metadata page to determine whether or not to process the destage request. In some implementations, processing 416 the destage request based upon, at least in part, the current tablet identifier for the metadata page may include skipping 418 the destage request when the current tablet identifier for the metadata page indicates that the metadata page read from the storage array is newer than the metadata data page to destage. Continuing with the above example, suppose that current tablet identifier 1104 indicates that metadata page 1102 as read from data array 112 does not contain any metadata deltas for tablets with a unique sequential identifier greater than that of tablet 606. For example, further suppose that lockless destaging process 10 completed a commit request previous to processing 404 destage request 1100 and that commit request updated metadata page with an up-to-date version of metadata page 1102 and that the current tablet identifier was updated with the largest unique sequential identifier up to the active tablet.

In this example, suppose that the last tablet destaged to metadata page 1102 was tablet 602. Lockless destaging process 10 may determine that, because the current tablet identifier for metadata page 1102 indicates that metadata page 1102 read from data array 112 is newer than the metadata data page to destage (e.g., based upon, at least in part, current tablet identifier 1104 for metadata page 1102 read from data array 112 and the plurality of destage tablets (e.g., tablets 604 and 606) that have not been destaged to metadata page 1102), destaging the metadata deltas of tablets 604 and 606 is moot. Accordingly, lockless destaging process 10 may skip 416 destage request 1100.

In some implementations, processing 416 the destage request based upon, at least in part, the current tablet identifier for the metadata page may include processing 420 the destage request when the current tablet identifier for the metadata page indicates that the metadata page read from the storage array is older than the metadata data page to destage. In another example, suppose that metadata page 1102 is read from data array 112 and that current tablet identifier 1104 for metadata page 1102 indicates that metadata page 1102 includes the metadata deltas from the tablet up to and including tablet 602. Further, suppose that tablets 604 and 606 have not been destaged. In this example, lockless destaging process 10 may determine that metadata page 1102 read from data array 112 is older than the metadata data page to destage (e.g., based on the metadata deltas of tablets 604 and 606). Accordingly, lockless destaging process 10 may process 416 destage request 1100 by applying the metadata deltas from tablets 604 and 606 to metadata page 1102 to generate updated metadata page 1106 and writing updated metadata page 1106 to metadata page store 702.

In some implementations and in response to destaging metadata page 1100 to metadata page store 702, node 100 may clear the entry associated with destage request 1100 from flush request lock queue 804 and may "wake up" the next commit request within flush request lock queue 804 (if it exists). In some implementations with the flush request lock queue, a destage operation and a read hit may not utilize the same lock. For example, a read hit operation may only hold a lock on a cache memory system (e.g., TxCache lock) while a destage operation may only hold storage array access lock. Accordingly, a read operation which "hits" TxCache will not be blocked by the destage operation.

In some implementations, lockless destaging process 10 may determine 422 that at least one node of the multi-node storage system has failed. For example and as will be described in greater detail below, the flush request lock queue may help reduce overall failover time during a storage node failure and may reduce storage accessibility "hiccups" to specific metadata pages or Logical Block Addresses (LBAs) rather than hiccups over all metadata pages within the storage array. Referring again to FIG. 8, suppose that at least one node (e.g., storage processor 126) fails. In this example, lockless destaging process 10 may determine 422 that storage processor 126 has failed based upon, at least in part, connection 130 between storage processor 100 and storage processor 126. However, it will be appreciated that lockless destaging process 10 may determine 422 that storage processor 126 has failed using other known methods within the scope of the present disclosure.

In some implementations, lockless destaging process 10 may pause 424 flush requests for each metadata page referenced within the flush request lock queue. For example, when a node fails, the surviving node may reprocess the flush operations to ensure the metadata pages on the storage array are consistent. Conventional approaches to reprocessing the flush operations to the storage array include pausing or quiescing all flush requests to the storage array. For each TxArea "owned" by the failed node, the surviving node may compare the metadata page on the storage array with the metadata page stored in the TxArea (e.g., NVRAM). If the metadata page on the storage array is older, the surviving node may flush the metadata page from the TxArea to the storage array. However, this conventional approach pauses all flush requests to the storage array which may lead to significant failover recovery times. In some implementations, lockless destaging process 10 may pause 424 only the flush requests for each metadata page referenced within the flush request lock queue. For example, lockless destaging process 10 may reference flush request lock queue 804 of storage processor 100 to determine which metadata pages have flush requests pending. In this manner, lockless destaging process 10 may determine which metadata pages have a version stored in the TxArea. In response to determining which metadata pages have a version stored in the TxArea, lockless destaging process 10 may pause 424 only those flush requests for those metadata pages with a version stored in the TxArea (as opposed to all flush requests for all metadata pages).

In some implementations, lockless destaging process 10 may flush 426 each metadata page referenced within the flush request lock queue from a non-volatile storage area to the storage array. For example, lockless destaging process 10 may flush 426 each metadata page referenced within flush request lock queue 804 from the NVRAM (e.g., TxArea) to data array 112. In this manner, lockless destaging process 10 may reduce the overall failover time and the amount of flush requests to reprocess by utilizing the entries within the flush request lock queue that indicate whether a metadata page has a version stored in NVRAM (e.g., TxArea).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving a flush request for a metadata page stored in a storage array of a multi-node storage system, wherein the flush request is a request to commit the metadata page from a cache memory system to the storage array, thus defining a commit request;
    queueing the flush request on a flush request lock queue on at least one node of the multi-node storage system; and
    processing, via multiple nodes of the multi-node storage system, one or more flush requests on the metadata page based upon, at least in part, the flush request lock queue, wherein processing, via the multiple nodes of the multi-node storage system, the one or more flush requests on the metadata page based upon, at least in part, the flush request lock queue includes:
        determining, at each node of the multi-node storage system, whether a destage request for the metadata page is being processed on any node of the multi-node storage system based upon, at least in part, the flush request lock queue;
        in response to determining that the destage request for the metadata page is being processed on at least one node, waiting until the destage request is cleared from the flush request lock queue; and
        in response to determining that the destage request for the metadata page is not being processed on any node, processing, via one node of the multi-node storage system, the commit request.

2. The computer-implemented method of claim 1, wherein the flush request is a request to destage the metadata page to the storage array, thus defining a destage request.

3. The computer implemented method of claim 2, wherein processing, via the multiple nodes of the multi-node storage system, the one or more flush requests on the metadata page based upon, at least in part, the flush request lock queue includes:
    reading the metadata page from the storage array;
    determining a current tablet identifier for the metadata page; and
    processing the destage request based upon, at least in part, the current tablet identifier for the metadata page.

4. The computer implemented method of claim 3, wherein processing the destage request based upon, at least in part, the current tablet identifier for the metadata page includes:
    skipping the destage request when the current tablet identifier for the metadata page indicates that the metadata page read from the storage array is newer than the metadata data page to destage; and processing the destage request when the current tablet identifier for the metadata page indicates that the metadata page read from the storage array is older than the metadata data page to destage.

5. The computer implemented method of claim 1, further comprising:
determining that at least one node of the multi-node storage system has failed;
pausing flush requests for each metadata page referenced within the flush request lock queue; and
flushing each metadata page referenced within the flush request lock queue from a non-volatile storage area to the storage array.

6. A computer program product residing on a non-transitory computer readable medium having a plurality of instructions stored thereon which, when executed by a processor, cause the processor to perform operations comprising:
receiving a flush request for a metadata page stored in a storage array of a multi-node storage system, wherein the flush request is a request to destage the metadata page to the storage array, thus defining a destage request;
queueing the flush request on a flush request lock queue on at least one node of the multi-node storage system; and
processing, via multiple nodes of the multi-node storage system, one or more flush requests on the metadata page based upon, at least in part, the flush request lock queue, wherein processing, via the multiple nodes of the multi-node storage system, the one or more flush requests on the metadata page based upon, at least in part, the flush request lock queue includes:
reading the metadata page from the storage array;
determining a current tablet identifier for the metadata page; and
processing the destage request based upon, at least in part, the current tablet identifier for the metadata page.

7. The computer program product of claim 6, wherein the flush request is a request to commit the metadata page from a cache memory system to the storage array, thus defining a commit request.

8. The computer program product of claim 7, wherein processing, via the multiple nodes of the multi-node storage system, the one or more flush requests on the metadata page based upon, at least in part, the flush request lock queue includes:
determining, at each node of the multi-node storage system, whether a destage request for the metadata page is being processed on the node based upon, at least in part, the flush request lock queue;
in response to determining that the destage request for the metadata page is being processed on at least one node, waiting until the destage request is cleared from the flush request lock queue; and
in response to determining that the destage request for the metadata page is not being processed on any node, processing, via one node of the multi-node storage system, the commit request.

9. The computer program product of claim 6, wherein processing the destage request based upon, at least in part, the current tablet identifier for the metadata page includes:
skipping the destage request when the current tablet identifier for the metadata page indicates that the metadata page read from the storage array is newer than the metadata data page to destage; and processing the destage request when the current tablet identifier for the metadata page indicates that the metadata page read from the storage array is older than the metadata data page to destage.

10. The computer program product of claim 6, wherein the operations further comprise:
determining that at least one node of the multi-node storage system has failed;
pausing flush requests for each metadata page referenced within the flush request lock queue; and
flushing each metadata page referenced within the flush request lock queue from a non-volatile storage area to the storage array.

11. A computing system comprising:
a memory; and
a processor configured to receive a flush request for a metadata page stored in a storage array of a multi-node storage system, wherein the flush request is a request to destage the metadata page to the storage array, thus defining a destage request, wherein the processor is further configured to queue the flush request on a flush request lock queue on at least one node of the multi-node storage system, and wherein the processor is further configured to process, via multiple nodes of the multi-node storage system, one or more flush requests on the metadata page based upon, at least in part, the flush request lock queue, wherein processing, via the multiple nodes of the multi-node storage system, the one or more flush requests on the metadata page based upon, at least in part, the flush request lock queue includes: reading the metadata page from the storage array, determining a current tablet identifier for the metadata page, and processing the destage request based upon, at least in part, the current tablet identifier for the metadata page.

12. The computing system of claim 11, wherein the flush request is a request to commit the metadata page from a cache memory system to the storage array, thus defining a commit request.

13. The computing system of claim 12, wherein processing, via the multiple nodes of the multi-node storage system, the one or more flush requests on the metadata page based upon, at least in part, the flush request lock queue includes:
determining, at each node of the multi-node storage system, whether a destage request for the metadata page is being processed on the node based upon, at least in part, the flush request lock queue;
in response to determining that the destage request for the metadata page is being processed on at least one node, waiting until the destage request is cleared from the flush request lock queue; and
in response to determining that the destage request for the metadata page is not being processed on any node, processing, via one node of the multi-node storage system, the commit request.

14. The computing system of claim 11, wherein processing the destage request based upon, at least in part, the current tablet identifier for the metadata page includes:
skipping the destage request when the current tablet identifier for the metadata page indicates that the metadata page read from the storage array is newer than the metadata data page to destage; and
processing the destage request when the current tablet identifier for the metadata page indicates that the metadata page read from the storage array is older than the metadata data page to destage.

\* \* \* \* \*